(12) United States Patent
Einzinger et al.

(10) Patent No.: US 9,813,169 B2
(45) Date of Patent: Nov. 7, 2017

(54) PRECISION MEASUREMENT OF TRANSMIT POWER USING LOOPBACK CALIBRATION IN AN RF TRANSCEIVER

(71) Applicants: Texas Instruments Deutschland GmbH, Freising (DE); Texas Instruments Incorporated, Dallas, TX (US)

(72) Inventors: Josef Einzinger, Georgensgmünd (DE); Sudipto Chakraborty, Plano, TX (US)

(73) Assignees: TEXAS INSTRUMENTS INCORPORATED, Dallas, TX (US); TEXAS INSTRUMENTS DEUTSCHLAND GMBH, Freising (DE)

( * ) Notice: Subject to any disclaimer, the term of this patent is extended or adjusted under 35 U.S.C. 154(b) by 0 days.

(21) Appl. No.: 14/946,360

(22) Filed: Nov. 19, 2015

(65) Prior Publication Data
US 2017/0149512 A1    May 25, 2017

(51) Int. Cl.
| H04W 52/08 | (2009.01) |
| H04B 17/13 | (2015.01) |
| H04B 1/40  | (2015.01) |
| H04W 52/52 | (2009.01) |

(52) U.S. Cl.
CPC ............. H04B 17/13 (2015.01); H04B 1/40 (2013.01); H04W 52/08 (2013.01); H04W 52/52 (2013.01)

(58) Field of Classification Search
CPC ......... H04B 17/13; H04B 1/40; H04W 52/08; H04W 52/52
See application file for complete search history.

(56) References Cited

U.S. PATENT DOCUMENTS

| 8,489,045 B2* | 7/2013 | Ly-Gagnon | H03F 3/24 455/114.3 |
| 8,526,533 B2* | 9/2013 | Sen | H04B 17/11 375/296 |
| 8,699,972 B2* | 4/2014 | Lee | H04W 52/04 455/114.3 |

(Continued)

OTHER PUBLICATIONS

Dogan et al., "Analysis and Design of RF CMOS Attenuators", J. Solid State Circ., vol. 43, No. 10 (IEEE, 2008), pp. 2269-2283.

(Continued)

*Primary Examiner* — Jean B Corrielus
(74) *Attorney, Agent, or Firm* — John R. Pessetto; Charles A. Brill; Frank D. Cimino

(57) ABSTRACT

An RF or other high frequency transceiver including a loopback reference channel for measurement of an absolute power level. A transmit channel in the transceiver includes a programmable power amplifier that can be controlled to operate at a selected power level, and a receive channel including a receive amplifier, mixers, filters, and analog-to-digital converters. The loopback reference channel includes a self-biased amplifier, followed by a series of buffers that generate a square wave from the received signal, and an attenuator applying an attenuation gain to the square wave. The transmit power at a programmed power level can be calculated from ratios of a measured power level of a transmitted signal as received by the receive channel to the measured power level of the transmitted signal using the loopback reference channel.

24 Claims, 6 Drawing Sheets

(56) References Cited

U.S. PATENT DOCUMENTS

| 2004/0127157 | A1* | 7/2004 | Chu ..................... | H04W 52/08 |
| | | | | 455/9 |
| 2008/0111623 | A1* | 5/2008 | Magnusen .............. | H03G 3/30 |
| | | | | 330/151 |
| 2008/0232436 | A1* | 9/2008 | Schwartz ............. | H03F 1/0205 |
| | | | | 375/146 |
| 2011/0124293 | A1* | 5/2011 | Kasai .................... | G01R 27/06 |
| | | | | 455/67.11 |

OTHER PUBLICATIONS

"RF Power Calibration Improves Performance of Wireless Transmitters", Application Note AN-1040 (Analog Devices, 2009), pp. 1-8.

* cited by examiner

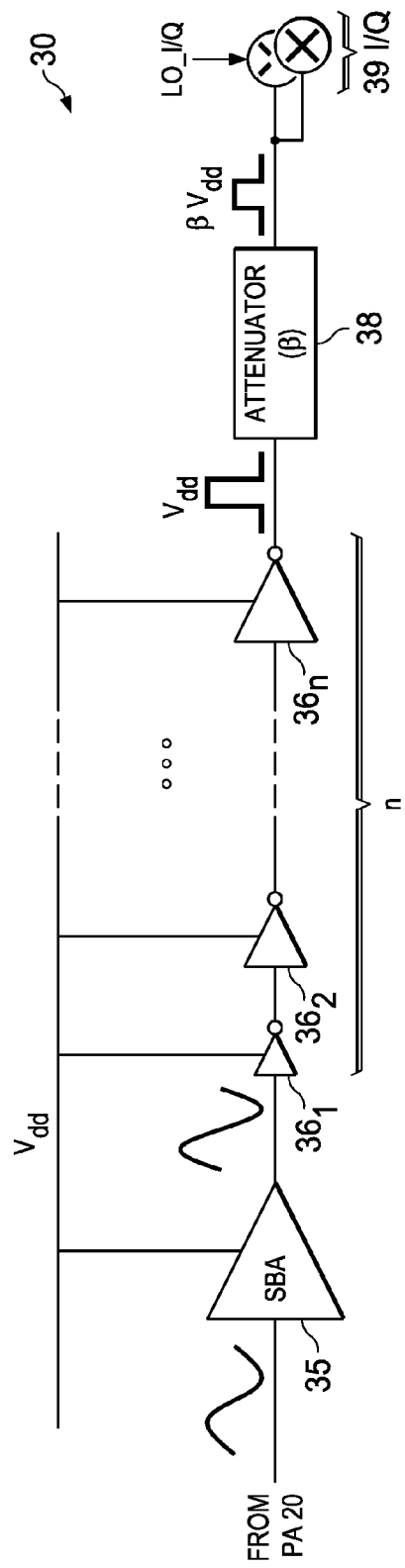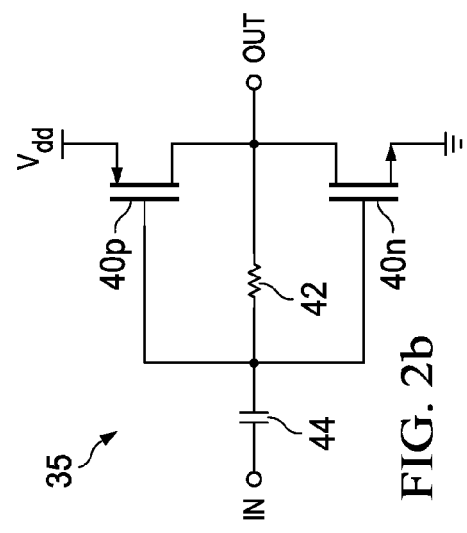
FIG. 2a
FIG. 2b

US 9,813,169 B2

PRECISION MEASUREMENT OF TRANSMIT POWER USING LOOPBACK CALIBRATION IN AN RF TRANSCEIVER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of communication circuits. Embodiments are more specifically directed to the calibration of transmitter circuits operating at high frequencies, such as radio frequency (RF).

Solid-state integrated circuits are now commonly used in the transmission and reception of signals in a wide range of communications systems, both over physical media (e.g., wire lines and optical fibers) and wirelessly at radio frequencies (RF). In either case, but particularly in the wireless context, the measurement and control of the power of the transmitted signal is of significant importance for maximizing battery longevity. For the example of wireless RF communications, constraints on transmission power arise from the need of multiple communications links to co-exist both spatially and in the frequency domain. Measurement and control of signal power from transmitters of all types is also necessary to minimize electromagnetic noise that can undesirably affect unrelated electronic systems.

As fundamental in the art, variations in manufacturing process parameters in the fabrication of modern integrated circuits cause corresponding variations in electrical parameters such as transistor gain, circuit switching speed, and the like. In addition, integrated circuits are also typically sensitive to variations in power supply voltage and operating temperature. For integrated circuits implemented in communications transmitters, these variations are reflected in the transmitted signal power relative to the nominal levels for which the circuits are designed. Accordingly, calibration and control of the transmitted signal power is generally necessary in order for communications systems to meet system and regulatory requirements.

One conventional approach to measurement and control of power in transmitter integrated circuits is known in the art as loopback calibration. Loopback calibration refers to the use of circuitry on the transmitter integrated circuit itself to obtain an output power measurement used in the control of the transmitter power amplifiers. In conventional transmitters, however, this loopback approach provides only a relative measurement of transmitter power because the on-chip loopback receiver circuitry is subject to the same process, voltage, and temperature variations as is the transmitter circuitry. As such, an absolute measurement of output power, with precise reference to an external standard, is necessary to properly calibrate the transmitter function, necessitating the use of external test equipment.

Accordingly, calibration of the transmitter power amplifier for RF transmitters and transmitter/receivers (transceivers) necessitates the use of RF test circuitry. As known in the art, however, RF and other high frequency test equipment is very expensive, resulting in high test cost for conventional RF transmitting circuits. The high cost of RF test equipment also discourages the addition of incremental test capacity, which can result in test becoming a bottleneck in the manufacturing flow.

BRIEF SUMMARY OF THE INVENTION

Disclosed embodiments provide an integrated circuit architecture including on-chip capability, and a corresponding method, for measuring the power output of a transmitter power amplifier.

Disclosed embodiments provide such an architecture and method that provides a precise absolute power measurement.

Disclosed embodiments provide such an architecture and method that is robust over variations in process, voltage, and temperature.

Disclosed embodiments provide such an architecture and method that requires minimum additional hardware and chip area.

Disclosed embodiments provide such an architecture and method that is compatible with a variety of technologies, including complementary metal-oxide-semiconductor (CMOS) and bipolar technologies.

Disclosed embodiments provide such an architecture and method that does not result in increased power consumption during normal operation.

Other objects and advantages of the disclosed embodiments will be apparent to those of ordinary skill in the art having reference to the following specification together with its drawings.

According to some embodiments, a transceiver circuit includes a loopback reference channel including an amplifier, one or more limiters, and a programmable attenuator. A receive channel in the transceiver circuit includes a low-noise amplifier with its output coupled to downconversion mixers; a pass-through signal path in the receive channel communicates an attenuated version of the signal to replica mixers without amplification by the low-noise amplifier. The loopback reference channel converts a received sinusoidal signal into a square wave with an amplitude proportional to a regulated voltage. In a calibration operation, a transmitter power amplifier transmits a high frequency tone at a programmed power level that received by the receive channel and by the loopback reference channel. Gain of the low-noise amplifier in the receive channel is determined from a ratio of the power of the signal received by the receive channel as amplified by the low-noise amplifier to the power of the signal communicated along the pass-through path of the receive channel. The absolute transmit power is determined from a ratio of the power of the signal from the pass-through path to the power of the signal processed by the loopback reference channel.

According to some embodiments, a transceiver circuit includes a loopback reference channel including an amplifier, one or more limiters, a programmable attenuator, and a replica low-noise amplifier that is a replica of an amplifier in the receive channel of the transceiver circuit. The loopback reference channel converts a received sinusoidal signal into a square wave with an amplitude proportional to a regulated voltage, and amplifies this square wave with the replica amplifier. In a calibration operation, a transmitter power amplifier transmits a high frequency tone at a programmed power level that is received by the receive channel and by the loopback reference channel. The absolute transmit power is determined from a ratio of the power of the signal from the receive channel to the power of the signal processed by the loopback reference channel.

BRIEF DESCRIPTION OF THE SEVERAL VIEWS OF THE DRAWING

FIG. 2a is an electrical diagram, in block form, of a loopback reference channel in the architecture of FIG. 1 according to that embodiment.

FIG. 2b is an electrical diagram, in schematic form, of a self-biased amplifier in the loopback reference channel of FIG. 2a according to that embodiment.

FIG. 4a is a flow diagram illustrating a process of measuring transmit power in the transceiver of FIG. 1 according to an embodiment including the LNA and loopback reference channel of FIG. 3a.

DETAILED DESCRIPTION OF THE INVENTION

The one or more embodiments that are described in this specification are in the context of a wireless RF (radio frequency) transceiver architecture, as it is contemplated that such implementation is particularly advantageous in such applications. However, it is also contemplated that concepts of this invention may be beneficially applied to other applications, for example in transmitters and receivers for wired communications, for wireless communications at frequencies other than in the RF bands, and indeed in any sort of end-to-end transmitter-receiver system in a wide range of continuous-time domain signal processing functions. In addition, it is contemplated that these embodiments may be realized in various device technologies, including metal-oxide-semiconductor (MOS), complementary MOS (CMOS), bipolar, BiCMOS, etc. Accordingly, it is to be understood that the following description is provided by way of example only, and is not intended to limit the true scope of this invention as claimed.

As discussed above, conventional techniques for measuring the transmit power of a transmitter circuit in absolute terms necessitate the use of external test equipment, because conventional loopback techniques provide only a relative measurement. As a result, external test equipment is conventionally used to obtain such measurements. Because this test equipment is typically quite expensive, particularly in high frequency (RF) applications, significant manufacturing test cost is involved in this measurement. These embodiments address this issue by providing on-chip measurement circuitry and a corresponding methodology for obtaining an absolute measurement of the power output by transmitter circuitry in a transceiver.

In a general sense, these embodiments are based on a translation of the power of a transmitted high frequency signal into a form that can be measured relative to a known absolute reference that is independent of variations in process parameters, voltage, and temperature. An external DC voltage, which may be precisely established by relatively inexpensive test equipment, provides such an absolute reference for this measurement. As another example, bandgap reference circuits are commonly used to provide a stable low frequency (DC) reference voltage, specifically a voltage corresponding to the bandgap voltage of silicon, which is stable over variations in process parameters, power supply voltage, and temperature, and can be used by voltage regulators to generate other stable voltages. This reference voltage produced by a bandgap reference circuit in the transmitter or transceiver circuit itself can thus provide a suitable absolute reference. According to these embodiments, the output power of a transmitted high frequency signal is translated into a low frequency, or DC, domain, for power measurement relative to such a stable absolute reference voltage or current.

Figure 1:
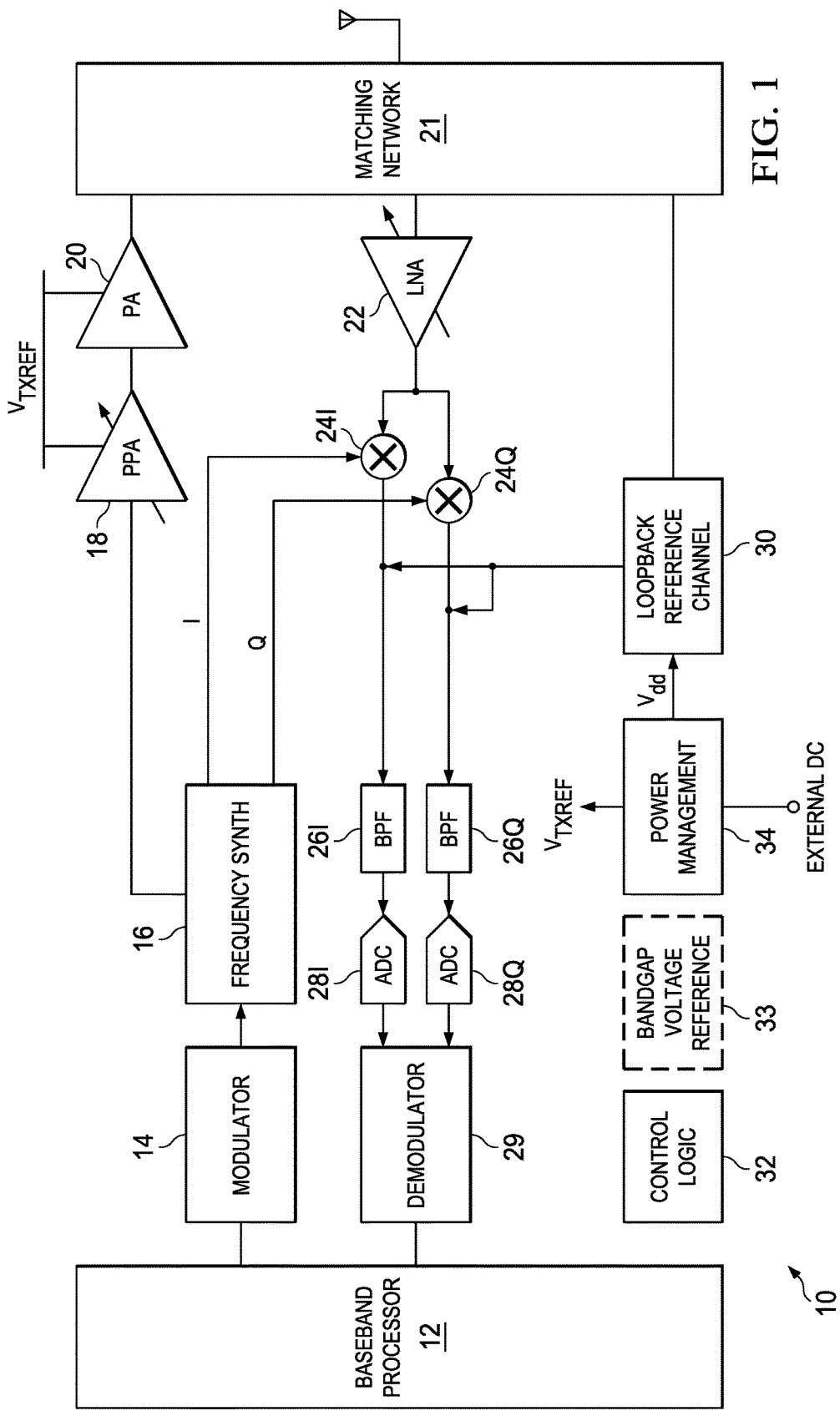
FIG. 1 is an electrical diagram, in block form, of a transceiver architecture according to an embodiment.

FIG. 1 illustrates the architecture of digital transceiver 10 constructed according to an embodiment. Transceiver 10 in this example is constructed for RF communications; as mentioned above, however, it is contemplated that this embodiment and its variations may be applied to a wide range of end-to-end transmitter/receiver architectures of many types, for either wired or wireless communications and at any one of a wide range of frequencies. In this embodiment, baseband processor 12 processes the data to be transmitted and the data received by transceiver 10. Baseband processor 12 may be implemented in whole or in part within transceiver 10 itself, or alternatively may correspond to a host processor or other external data processing function.

The transmit channel of transceiver 10 includes modulator 14, which performs conventional modulation processing of digital data from baseband processor 12 that are to be transmitted, with that modulation according to the desired modulation scheme for the particular communications to be carried out. These modulated data are forwarded to frequency synthesizer 16, which typically includes one or more voltage-controlled oscillators that produce an RF signal, modulated according to the data from modulator 14. The modulated RF signal is applied to programmable power amplifier 18, the output of which is presented to power amplifier 20 to present the output signal to the communications facility (e.g., an antenna) via impedance matching network 21. As will be discussed below, programmable power amplifier 18 controls the power level of the transmission from transceiver 10, for example in response to programming signals from control logic 32 in this architecture.

The receive channel of transceiver 10 includes a receive amplifier that receives the signal from an antenna or other communications facility via matching network 21 and amplifies that received signal. In this example, the receive amplifier is in the form of variable gain low noise amplifier (LNA) 22, which applies a controllable or selectable amplification to the received signal, for example by including an input attenuator that responds to signals from control logic 32, and as such LNA 22 is primarily responsible in setting the sensitivity of the receive channel of transceiver 10. To obtain high selectivity at the receiver, the output of LNA 22 is applied to mixers 24I, 24Q, which down-convert the received and amplified RF signal to an intermediate frequency (IF) in the conventional manner, based upon in-phase and quadrature-phase local oscillator (LO) signals, respectively, from frequency synthesizer 16. These IF signals are filtered by bandpass filters 26I, 28Q, and converted to digital in-phase and quadrature-phase data by analog to digital converters (ADCs) 28I, 28Q, respectively. Demodulator 29 demodulates the digitized IF data to baseband, and carries out other conventional digital processing such as automatic gain control (AGC), fine channel filtering, packet and frame synchronization, and the like as appropriate to recover the payload of the received signals, for processing by baseband processor 12 as desired.

Transceiver 10 also includes other support circuitry as conventional in the art for its operation and application. Such additional circuitry includes functions such as crystal oscillator circuitry for generating internal clock signals based on an external crystal, interface circuitry for carrying out communications with other circuits and systems, and the like. According to this embodiment, transceiver 10 also includes power management system 34, which produces regulated bias voltages for application to circuits within transceiver 10. In this embodiment, one such regulated voltage supplied by power management system 34 is a $V_{dd}$ power supply voltage applied to loopback reference channel 30 as will be described below, and a bias voltage $V_{TXREF}$ powering programmable power amplifier 18 and power amplifier 20. The regulated voltages produced by power management system 34 may be based on an external DC voltage, or alternatively or additionally based on bandgap voltage reference 33, as shown in FIG. 1. Alternatively, the $V_{dd}$ power supply voltage may itself be an externally applied DC voltage, which may be precisely controlled by test equipment. In any case, the voltages generated by power management system 34 are contemplated to be stable over process, voltage, and temperature variations. And as mentioned above, transceiver 10 includes control logic 32 for controlling the operation of the various functions within transceiver 10. According to this embodiment, control logic 32 is configured to control these functions to carry out the functions involved in transmission and receipt of signals in normal operation, and also to perform power measurement functions in the manner described in further detail below. It is contemplated that this configuration of control logic 32 will typically be implemented by way of program instructions, stored in a memory resource within or available to control logic 32, that cause control logic 32 to control the functions of transceiver 10 to implement these operations; alternatively, control logic 32 may be implemented as hardware configured to perform some or all of these functions.

Transceiver 10 also includes loopback reference channel 30, which carries out the measurement of the power level of signals transmitted by the transmit channel of programmable power amplifier 18 and power amplifier 20 according to these embodiments. In this example, loopback reference channel 30 can be directly or indirectly coupled to the output of power amplifier 20 to receive the transmitted signal from the transmit channel, and to amplify and process that signal in the manner described below. More specifically, according to this embodiment, loopback reference channel 30 translates the received RF signal to a form in which the power level of the signal can be determined internally by transceiver 10, with reference to a stable reference level such as an external DC voltage or a voltage produced by bandgap voltage reference 33. This translated signal from loopback reference channel 30 is applied to the receive data path, for example at the inputs of filters 26I, 26Q as shown in FIG. 1. Alternatively, as will be described in further detail below, the output of loopback reference channel 30 may be applied to mixers 24I, 24Q, or elsewhere in the receive path as appropriate. Depending on the particular arrangement, loopback reference channel 30 may thus have its own mixers for receiving and processing the loopback signals outside of the receive channel, in which case it is desirable that such mixers in loopback reference channel 30 be closely matched to mixers 24 of the receive channel.

FIG. 2a illustrates the construction and operation of loopback reference channel 30 according to an embodiment. Loopback reference channel 30 in this embodiment is constructed using transistors that increase in size and drive strength along the signal path, as will be described below. In this implementation, the input of self-biased amplifier 35 receives the transmitted signal from power amplifier 20. The connection between the output of power amplifier 20 and loopback reference channel 30, specifically the input to amplifier 35, may be a path internal to transceiver 10 (e.g., a conduction path that may be selectively closed, for example by pass transistors or the like), or alternatively a path made by an external connection of an output terminal (Tx) of transceiver 10 to an input terminal to loopback reference channel 30. In any case, as suggested by FIG. 2a and as will be described in further detail below, the transmitted signal received at the input to amplifier 35 is contemplated to be an AC signal (e.g., a single tone sinusoid) at a nominal carrier frequency. Amplifier 35 serves to amplify this received signal, as suggested by the higher amplitude sinusoid indication at the output of amplifier 35 in FIG. 2a.

As mentioned above, amplifier 35 may be of the self-biased type, in that its output signal is centered at a midpoint voltage between the bias voltages applied to amplifier 35. FIG. 2b illustrates the construction of self-biased amplifier 35 according to this embodiment, for the example of a CMOS implementation. In this example, p-channel MOS transistor 40p has its source at the $V_{dd}$ power supply voltage (from power management system 34), and its drain at output node OUT of amplifier 35; n-channel MOS transistor 40n has its source at a ground level (i.e., $V_{ss}$), and its drain connected to the drain of transistor 40p at output node OUT. It is contemplated that transistors 40p, 40n are preferably fabricated at the minimum transistor sizes for the integrated circuit implementing transceiver 10, to reduce loading to matching network 21. The gates of transistors 40p, 40n are connected together, and are capacitively coupled to input node IN via capacitor 44 to eliminate DC bias in the input signal from appearing at the output of amplifier 35. The self-biasing effect results from resistor 42 coupling the common gate node of transistors 40p, 40n to their common drain node at output node OUT. As a result of this self-biasing, an AC signal at input node IN will produce an AC signal at output node OUT that is centered (i.e., has a DC component) at a mid-rail voltage between the $V_{dd}$ power supply voltage and ground. This centering of the amplified signal reduces clipping of the received signal in loopback reference channel 30, facilitating the power measurement described below.

The output of amplifier 35 is applied to the input of a first of a series of n limiter stages $36_1$ through $36_n$ in this embodiment. Each limiter stage $36_x$ is constructed as an inverter (as shown in FIG. 2b) or a non-inverting buffer, each biased by the same $V_{dd}$ power supply voltage from power management system 34 as is amplifier 35. Each limiter stage $36_x$ thus produces a waveform approximating a square-wave pulse in response to the signal at its input. While a single limiter stage $36_1$ will produce an approximation of a square wave from a sinusoidal input, it is beneficial for power measurement that the output of the last of limiter stages $36_1$ through $36_n$ be as close to ideal as possible. By providing a number n of limiter stages $36_1$ through $36_n$, for example five or six (n=5 or n=6) such stages, it is contemplated that a nearly ideal square wave can be generated at all process and temperature corners. In this implementation, as mentioned above, limiter stages $36_1$ through $36_n$ are constructed of transistors of increasing size and thus increasing drive strength, such that limiter stage $36_1$ will be constructed using relatively small transistors with relatively low drive strength and limiter stage $36_n$ will be constructed of the largest transistors and thus serve as the strongest stage. This gradual approach reduces the amplitude uncertainty of the resulting square wave at the output of final limiter stage $36_n$, which is in the form of a rail-to-rail square wave with an amplitude at the $V_{dd}$ power supply voltage that biases the final limiter stage $36_n$.

According to this embodiment, the same $V_{dd}$ power supply voltage biases self-biased amplifier 35 and limiter stages $36_1$ through $36_n$. For purposes of these embodiments, it is beneficial to generate this $V_{dd}$ power supply voltage as a regulated voltage, such as produced by generated by power management system 34 based on an external DC voltage (as may be applied by relatively simple external test equipment) or a bandgap voltage produced by bandgap voltage reference 33. As a result, the amplitude of the square wave at the output of the final limiter stage $36_n$ is precisely at a known amplitude that is stable over process, voltage, and temperature, especially so if the number of limiter stages 36 is sufficiently large. Conversely, the amplitude of this square wave produced by the final limiter stage $36_n$ in loopback reference channel 30 is independent of the amplitude of the signal received by amplifier 35, and thus independent of the power level from the transmit channel of transceiver 10.

According to this embodiment, as shown in FIG. 2a, the output of the final limiter stage $36_n$ is applied to attenuator 38. Attenuator 38 may be constructed as a conventional attenuator circuit compatible with the desired manufacturing technology and with the frequency of the transmitted signal, for example as a conventional CMOS RF attenuator of either a "T" or "Π" network, to generate an output signal corresponding to the signal received at its input, but at an attenuated amplitude. More specifically, the output of attenuator 38 in this embodiment is a square wave at a precise amplitude that is less than the rail-to-rail swing of the square wave from the final limiter stage $36_n$, so as not to saturate the downstream mixers 24I, 24Q. Examples of conventional RF attenuator designs suitable for use in connection with this embodiment are described in Dogan et al., "Analysis and Design of RF CMOS Attenuators", *J. Solid State Circ.*, Vol. 43, No. 10 (IEEE, 2008), pp. 2269-83. In this embodiment, the attenuation applied by attenuator 38 is expressed as a gain β, which may be selected by control logic 32 according to a received input, the pre-stored contents of a configuration register, or the like; alternatively, this gain β may be hard-wired into attenuator 38. In any case, gain β is a precisely known gain value. In addition, it is desirable that the transistors and other components used to realize attenuator 38 are of a matching or ratioed size relative to similar devices in amplifier 35 or limiter stages $36x$, to ensure that gain β is stable over process, voltage, and temperature variations. Attenuator 38 thus produces a square wave output at an amplitude corresponding to the product of gain β and the regulated $V_{dd}$ power supply voltage, as shown in FIG. 2a.

In this embodiment, the square wave output from attenuator 38 is applied to matching replica mixers 39I, 39Q, which receive an in-phase and a quadrature-phase local oscillator signal, respectively. Replica mixers 39I, 39Q are preferably constructed to closely match mixers 24I, 24Q in the receive channel, for example by being implemented with similarly-sized (e.g., minimum size) transistors physically near to the transistors of mixers 24I, 24Q. As such, the performance and behavior of replica mixers 39I, 39Q closely matches that of mixers 24I, 24Q. In addition, it is contemplated that both mixers 24I, 24Q and replica mixers 39 I/Q will also include minimum size transistors to selectably connect and isolate the mixers to and from the signal path as appropriate in the power calibration process.

It is contemplated that variations and alternatives to the implementation of loopback reference channel 30 described above, as may be apparent to those skilled in the art having reference to this specification, may be implemented as appropriate for a particular application. For example, it is contemplated that the circuit functions of loopback reference channel 30 may be implemented as differential amplifiers, limiters, attenuators, etc., rather than as the single-ended circuits described above. Further in the alternative, and as mentioned above, loopback reference channel 30 may be realized using bipolar transistor technology rather than CMOS, depending on the technology used to realize the remainder of transceiver 10. These and other alternatives and variations are contemplated to be within the scope of the invention as claimed below.

In any case, amplifier 35, limiter stages $36_x$, and attenuator 38 in an integrated circuit implementing transceiver 10 may be realized by efficient, minimal chip area, designs, without necessitating circuit techniques (and the additional devices and chip area required) for reducing power consumption, even for transceivers in power-aware applications such as battery-powered systems and even though these circuit functions are operating at the full RF carrier speed (e.g., on the order of 2.5 GHz in some applications). Power consumption by loopback reference channel 30 is of little concern because of the limited time that loopback reference channel 30 is used during normal operation; it is contemplated instead that loopback reference channel 30 will only be active during a calibration phase of transceiver 10. Accordingly, it is contemplated that loopback reference channel 30 can be very efficiently implemented in existing designs, with little if any added cost.

Figure 3A:
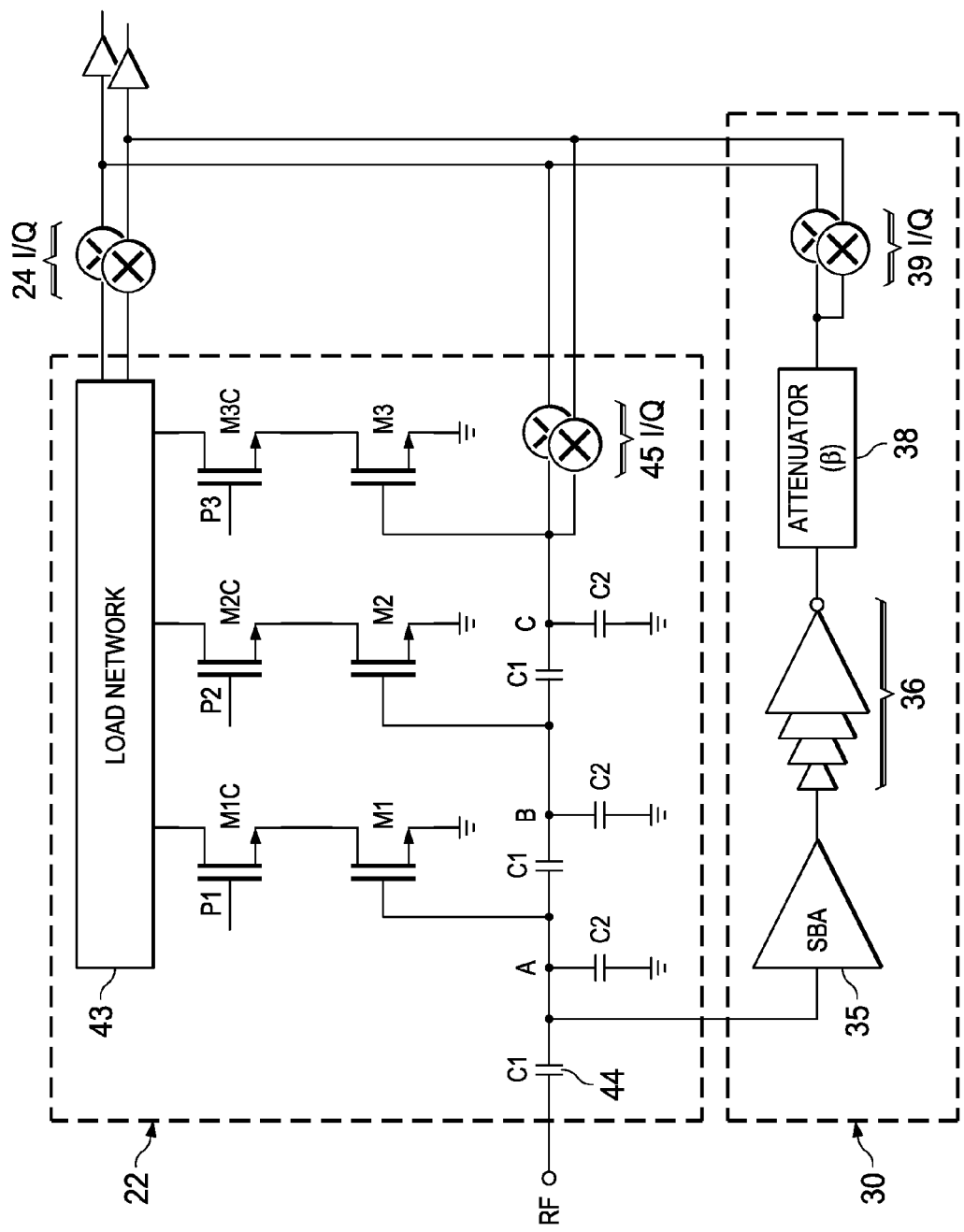
FIG. 3a is an electrical diagram, in schematic form, of a low noise amplifier (LNA) and loopback reference channel in the architecture of FIG. 1 according to an embodiment.

FIG. 3a illustrates, in more detail, the construction of LNA 22 in combination with loopback reference channel 30 according to an embodiment. As mentioned above, LNA 22 is a variable gain amplifier, and as such is constructed to apply a selectable attenuation α to the received signal at its RF input. In normal operation, this attenuation α is modulated with the amplitude of the received signal to optimize the sensitivity of the receive channel. In this embodiment, as typical in the art, this selectable attenuation α is implemented by way of low-loss reactive components. In this regard, input capacitor 44 capacitively couples the signal at input RF to node A; capacitor C2 is connected between this node A and ground. Node A is connected to the gate of n-channel MOS transistor M1, the source/drain path of which is connected in series with that of cascode transistor M1C between load network 43 and ground. The gate of transistor M1C receives a control signal P1. Similar stages are connected in series from node A, with capacitor C1 (of the same capacitance of input capacitor 44 in this embodiment) coupling node A to node B. Another instance of capacitor C2 is coupled between node B and ground, and node B is connected to transistor M2 in series with cascode transistor M2C between load network 43 and ground. Another similar stage of capacitor C1, C2 and transistors M3, M3C is coupled to node B in like manner. Load network 43 in this embodiment is a low-loss inductive network that converts the signal from single-ended to differential, and forwards the resulting differential signal to mixers 24I, 24Q and subsequent stages in the receive channel.

The attenuation α applied by LNA 22 is realized by control signals P1, P2, P3 at the gates of cascode transistors M1C, M2C, M3C, respectively. For minimum attenuation, a high level is applied to control signal P1 and low levels to control signals P2, P3, so that the signal at node A is communicated via transistor M1C and load network 43 to mixers 24I, 24Q. Maximum attenuation is inserted by a high level at control signal P3 and low levels at control signals P1, P2 to communicate the signal at node C. The capacitance ratio of a particular stage is determined by the ratio of its capacitor C1 to the capacitances of capacitor C2 plus the gate capacitance of its transistor M1, M2, M3, with the attenuation of any preceding stages included in later stages.

Also in this embodiment, LNA 22 includes replica mixers 45 I/Q connected to the last attenuation stage, which is at node C in this example. Similarly as replica mixers 39 I/Q in loopback reference channel 30, mixers 45 I/Q are preferably constructed to closely match mixers 24I, 24Q by way of minimum size transistors physically near to those of mixers 24I, 24Q, such that the performance and behavior of replica mixers 45 I/Q replicates that of mixers 24I, 24Q. This connection of node C of LNA 22 directly to replica mixers 45 I/Q essentially establishes a "pass-through" signal path in the receive channel, because this signal received by replica mixers 45 I/Q bypasses the amplification of a cascode transistor pair and load network 43 and thus does not include the LNA gain. The outputs of replica mixers 45 I/Q are forwarded to filters 26I, 26Q and the rest of the receive channel, in parallel with the outputs of replica mixers 39 I/Q in loopback reference channel 30 as shown in FIG. 3a. In this embodiment, replica mixers 39 I/Q will also include transistors matching those in mixers 24I, 24Q and replica mixers 39I, 39Q that control connection and isolation of mixers 39 I/Q to and from the signal path. Alternatively, this selection and isolation may be made by controlling bias currents to the mixers, or by use of a physical switch (e.g., a multiplexer) for selectably coupling mixer outputs to the downstream receive channel.

Figure 4A:
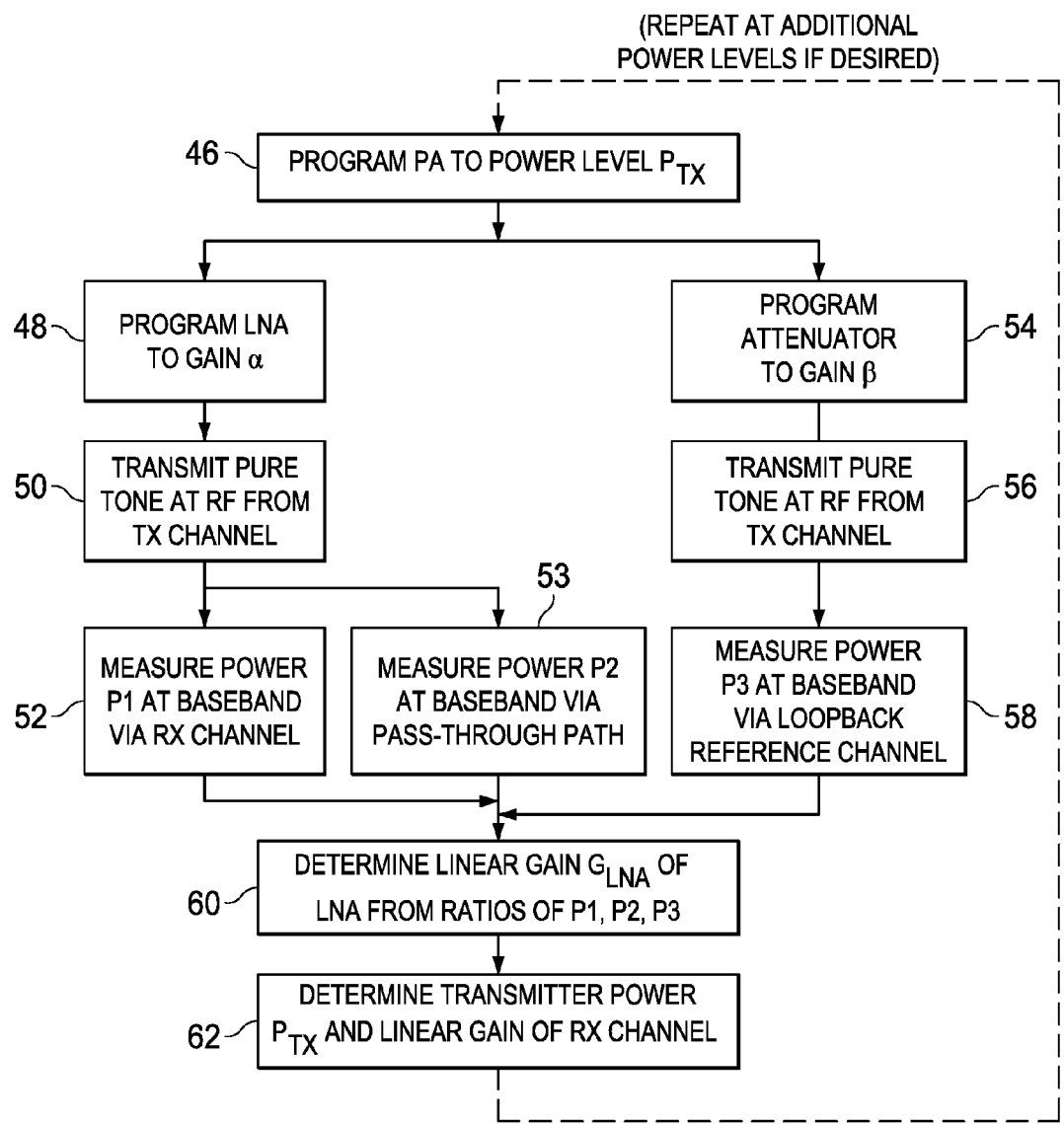

Referring now to FIG. 4a, the operation of transceiver 10 to obtain an absolute measurement of transmit power according to the embodiment of FIG. 3a will now be described. It is contemplated that this measurement process will typically be performed at the time of manufacture as part of an overall factory calibration sequence. In that context, the measurement process of this embodiment will be initiated by an external input to transceiver 10, for example by relatively simple (e.g., low frequency) test equipment; in this case, a precise external DC voltage may also be applied to power management system 34, to serve as a reference voltage for the bias and power supply voltages relevant to power measurement. Alternatively or in combination with external control signals or instructions, it is contemplated that program memory (not shown) within transceiver 10 may store program instructions that can be executed by control logic 32 to carry out the internal operations involved in the power measurement process. In addition, this measurement requires that the transmit output of transceiver 10 be coupled to the inputs of the receive channel and loopback reference channel 30; if these terminal nodes are not internally coupled to one another, the test equipment or other external connection of these terminal nodes to one another must also be effected. In any case, it is contemplated that those skilled in the art having reference to this specification will be readily able to realize the appropriate internal and external program instructions and other control signals and inputs so as to carry out this process as suitable for a particular implementation.

As shown in FIG. 4a, the power measurement operation begins with process 46, in which programmable power amplifier 18 is programmed to a power level $P_{TX}$. This particular power level $P_{TX}$ may be close to its full available power level, at a nominal power level (e.g., 0 dBm), or at a low power level. As will be mentioned below, this power measurement operation may be repeated at multiple power levels to obtain a measure of the linearity of power amplifiers 18, 20.

In this embodiment, the determination of the absolute transmit power level according to this embodiment is based on three measurements of a transmitted signal at a given power level $P_{TX}$, one as received by the normal attenuated path through LNA 22, one by way of replica mixers 45 I/Q in LNA 22, and the other as received by loopback reference channel 30. Accordingly, these measurements are made separately, as shown by parallel branches in FIG. 4a; the order in which these measurement branches are executed is not of importance. Indeed, it is also contemplated that these measurement branches may operate simultaneously, so long as the effects of attenuation of the signal by the opposite branch are known or insignificant.

The measurement of the transmitted signal as received by the normal receive channel of transceiver 10 begins with process 48, in which LNA 22 is programmed to a gain α. For example, referring to FIG. 3a, a high level is applied to control signal P1 and low levels to control signals P2, P3 in this process 48, coupling node A to load network 43 via transistors M1, M1C. Once the gain α of LNA 22 is set, the transmit channel operates to transmit a signal at power level $P_{TX}$ in process 50; for ease of measurement, it is desirable for the signal in process 50 to be a "pure" tone, that is a single-frequency sinusoid at a nominal carrier frequency (e.g., about 2.5 GHz for an RF transceiver). In process 52, the receive channel of LNA 22, mixers 24I, 24Q, filters 26I, 26Q, and ADCs 28I, 28Q receives and processes the pure tone transmitted in process 50 to produce a digital baseband signal; also in process 52, baseband processor 12 or other digital circuitry calculates a power level $P_1$ from this digital baseband signal, for example by way of a conventional algorithm for calculating the power of a discrete time domain signal. This power level $P_1$ can be considered as the product of the transmit power with the gains applied in the receive channel:

$$P_1 = P_{TX} \times \alpha \times G_{LNA} \times G_{MIX} \times G_{BB}$$

where $G_{LNA}$ is the gain of LNA 22 (i.e., via the applicable cascode transistors and load network 43), $G_{MIX}$ is the effective gain of mixers 24I, 24Q, and $G_{BB}$ is the gain applied to the received signal at the baseband frequency.

In process 53, which may be performed prior to or later than process 52, mixers 24I, 24Q are disconnected or isolated from the cascode transistors (such as transistors M1, M1C) and load network 43, and mixers 45 I/Q are enabled. As a result, the RF signal appearing at node C is forwarded directly to mixers 45 I/Q and does not see the gain $G_{LNA}$ but only an attenuation γ determined by the applicable capacitance ratio. This signal communicated via the pass-through signal path in the receive channel is forwarded via filters 26I, 26Q, ADCs 28I, 28Q to demodulator 29 for demodulation to baseband, where the power is measured, also in process 53. The power level $P_2$ of the signal determined in this process 53 via replica mixers 45 I/Q can be considered as the product of the attenuation γ with the downstream gains of the receive channel:

$$P_2 = P_{TX} \times \gamma \times G_{MIX} \times G_{BB}$$

Because the cascode transistor pair and load network 43 are not involved in this bypass ("pass-through") signal path, gain $G_{LNA}$ is not part of this power measurement. The mixer gain $G_{MIX}$ in this determination of power level $P_2$ is the same as in the determination of power level $P_1$ because of the matching of replica mixers 45 I/Q to mixers 24I, 24Q.

Measurement of the transmitted signal by loopback reference channel 30 begins with process 54, in which control logic 32 sets the attenuation applied by attenuator 38 to a known gain β. In process 56, the transmit channel then operates to transmit the "pure" carrier frequency tone as transmitted in process 50, at the same saturated power level $P_{TXREF}$. Loopback reference channel 30 processes this transmitted signal in process 58, specifically by amplifier 35 amplifying and centering (i.e., mid-rail) the received signal, limiting stages 36$_0$ through 36$_n$ translating the signal into a rail-to-rail square wave, and attenuator 38 applying the selected attenuation gain β. The resulting signal is then processed via replica mixers 39I, 39Q, and the downstream functions of filters 26I, 26Q, ADCs 28I, 28Q, and demodulator 29 in the receive channel to produce a digital baseband signal. Also in process 58, baseband processor 12 or other digital circuitry calculates a power level $P_3$ of this digital baseband signal, in the same manner as in process 52. This power level $P_3$ depends on the gains in loopback reference channel 30:

$$P_3 = V_{DD} \times \beta \times G_{MIX} \times G_{BB}$$

Again, mixer gain $G_{MIX}$ in this determination of power level $P_3$ is the same as in the determination of power level $P_1$ because of the matching of replica mixers 39 I/Q to mixers 24I, 24Q. Gain $G_{BB}$ is also identical to that involved in power levels $P_1$ and $P_2$ because the receive channel is the same in each case. The actual power level of the transmitted signal itself is effectively lost in loopback reference channel 30 because limiting stages 36$_0$ through 36$_n$ translate the signal into a rail-to-rail square wave, regardless of the power level of the received signal, but instead measured power level $P_3$ is proportional to $V_{DD}$.

According to this embodiment, once the received power levels $P_1$, $P_2$, and $P_3$ are known from processes 52, 53, and 58, baseband processor 12 executes process 60 to determine the linear gain $G_{LNA}$ of LNA 22 from a ratio of the power levels $P_1$ and $P_2$:

$$\frac{P_1}{P_2} = \frac{P_{TX} \times \alpha \times G_{LNA} \times G_{MIX} \times G_{BB}}{P_{TX} \times \gamma \times G_{MIX} \times G_{BB}} = \frac{\alpha \times G_{LNA}}{\gamma}$$

Because of the low-loss components involved in the construction of LNA 22 in both of its signal paths, both attenuation gains α and γ are precisely known, which allows the precise calculation of linear gain $G_{LNA}$ of LNA 22 in process 60.

In process 62, an absolute measure of the transmit power level $P_{TX}$ is calculated from a ratio of the measured power levels $P_2$ and $P_3$:

$$\frac{P_2}{P_3} = \frac{P_{TX} \times \gamma \times G_{MIX} \times G_{BB}}{\beta V_{DD} \times G_{MIX} \times G_{BB}} = \frac{P_{TX} \times \gamma}{\beta V_{DD}}$$

and solving for power level $P_{TX}$. This result is an absolute measure of power level $P_{TX}$, rather than merely a relative measure, because the attenuation gains β and γ are precisely known from the low-loss components in attenuator 38 and LNA 22, as is the power supply voltage $V_{DD}$, which is based on an external voltage or a known reference voltage (e.g., a bandgap voltage). Transmit power level $P_{TX}$ can thus be calculated with precision, such that a calibration of the power level programmed in process 46 with its absolute as-transmitted power level $P_{TX}$ as determined in process 62 is obtained. This calibration of course permits precise control of the actual transmit power of transceiver 10, without requiring expensive RF or other high frequency test equipment. Also according to this embodiment, once the absolute power level $P_{TX}$ is obtained, any of the equations for power levels $P_1$, $P_2$, $P_3$ can be used to calculate the gain product $G_{MIX} \times G_{BB}$ in process 62.

The calibration operation of FIG. 4a can be repeated at different transmit power levels $P_{TX}$ if desired. For example, the measurement of the absolute transmit power $P_{TX}$ at both a high programmed level and a low programmed level can provide a measure of the linearity of power amplifiers 18, 20 in the transmit channel, and thus enable more precise setting and control of intermediate power levels between those extrema.

Figure 3B:
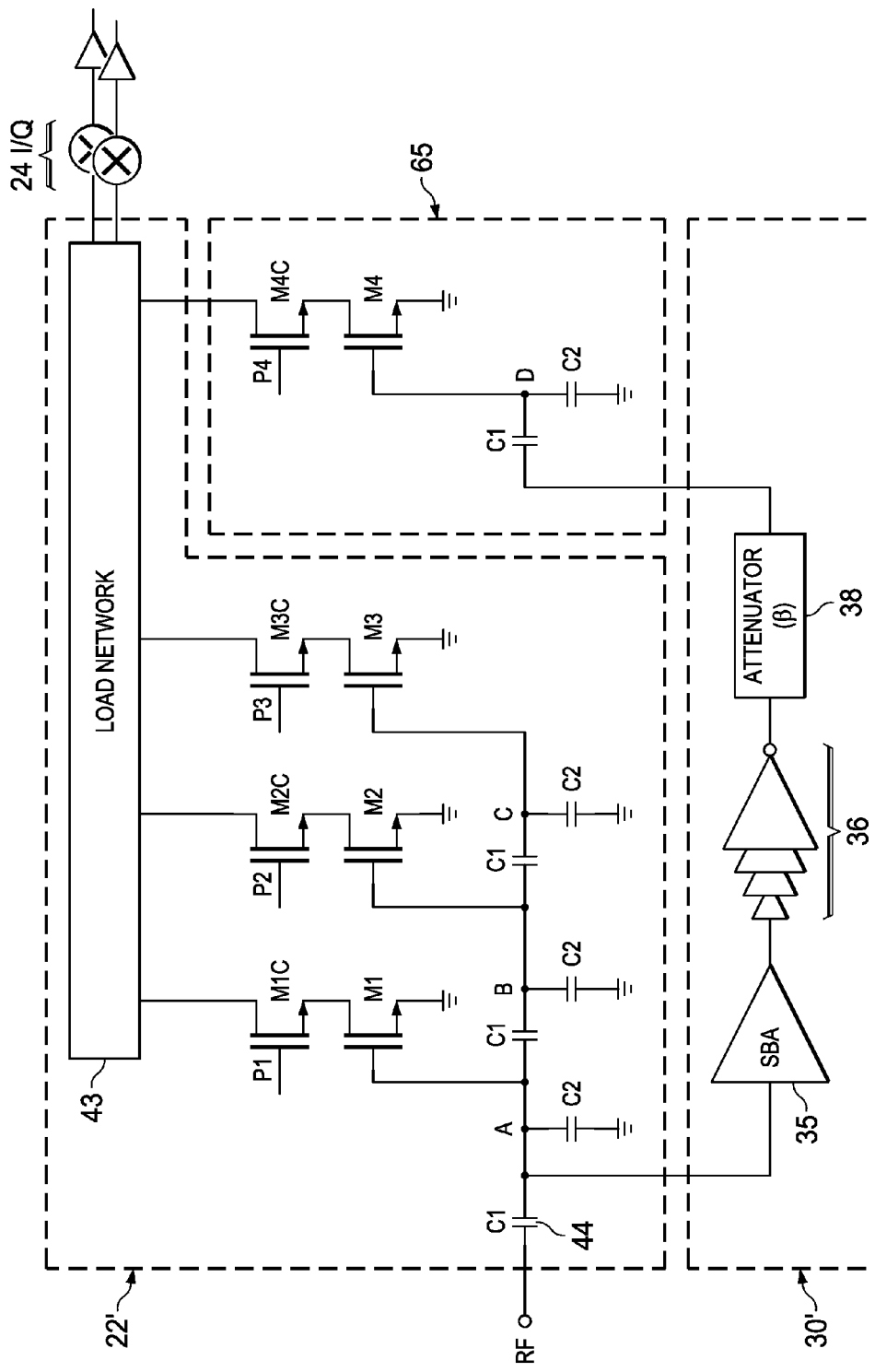
FIG. 3b is an electrical diagram, in schematic form, of the LNA and loopback reference channel in the architecture of FIG. 1 according to another embodiment.

FIG. 3b illustrates LNA 22' and loopback reference channel 30' according to an alternative embodiment. In this embodiment, the parallel path within LNA 22' is not included (i.e., replica mixers 45 I/Q are omitted), but rather LNA 22' is constructed only with its programmable attenuation branches of pairs of ratioed capacitors C1, C2 and corresponding cascode transistor pairs M1, M1C; M2, M2C; M3, M3C as shown.

Loopback reference channel 30' in this example communicates its attenuated signal through LNA 65, which is a replica of one branch of the capacitance network (C1, C2) and cascode transistors in LNA 22'. Specifically, the output of attenuator 38 is capacitively coupled via an instance of capacitor C1 to a node D within replica LNA 65, at which another instance of capacitor C2 is connected to ground. Node D is connected to a cascode transistor pair, specifically at the gate of transistor M4. Transistor M4 has its source/drain path connected in series with that of cascode transistor M4C between load network 43 and ground; the gate of transistor M4C receives control signal $P_4$. As evident from FIG. 3b, loopback reference channel 30' does not use replica mixers in this embodiment. The use of replica LNA 65 in this configuration results in the gain $G_{LNA}$ appearing in both the receive channel and also loopback reference channel 30'.

Figure 4B:
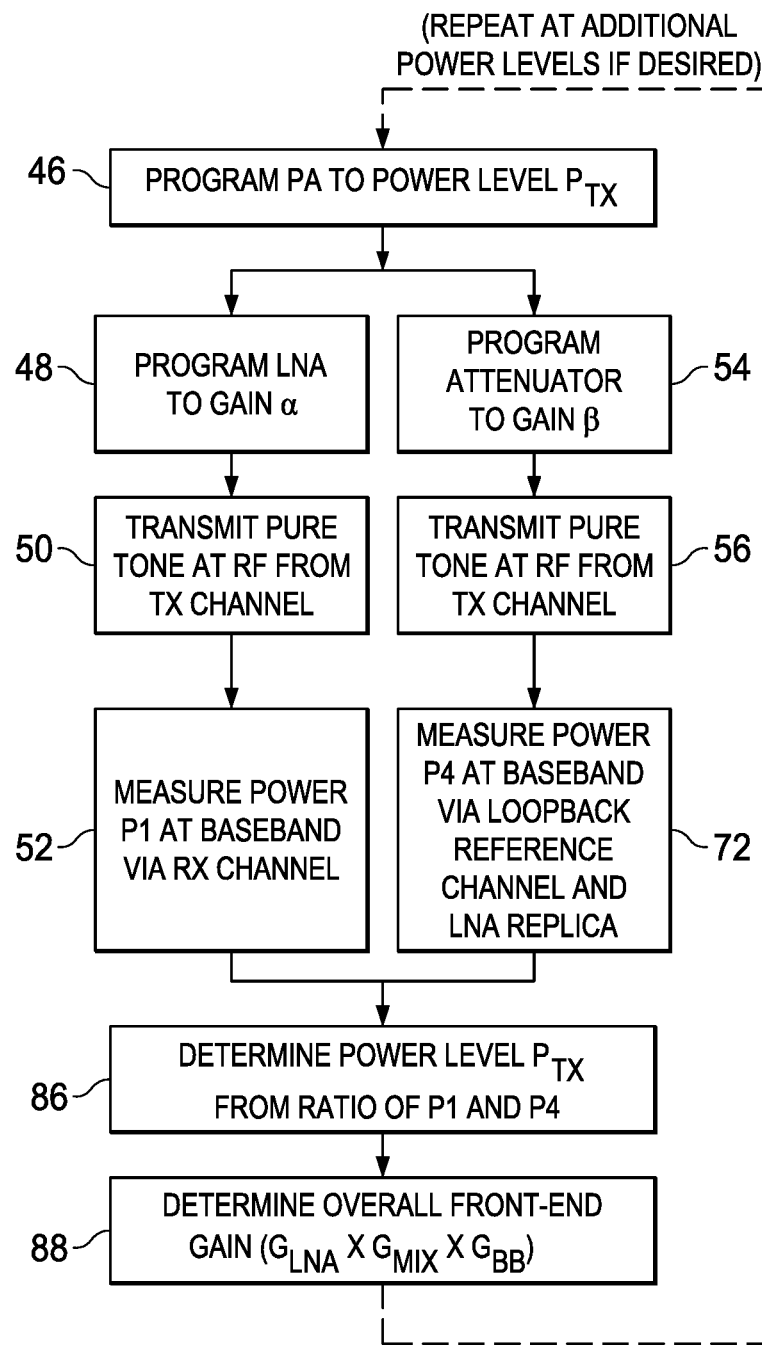
FIG. 4b is a flow diagram illustrating a process of measuring transmit power in the transceiver of FIG. 1 according to an embodiment including the LNA and loopback reference channel of FIG. 3b.

FIG. 4b illustrates a calibration process using the arrangement of FIG. 3b. As described above relative to FIG. 4a, power amplifiers 18, 20 are programmed to a power level $P_{TX}$ in process 46, LNA 22' is programmed to an attenuation (i.e., gain) α in process 48, and a pure tone is transmitted by the transmit channel in process 50. And also as before, the power level $P_1$ of the signals as received by LNA 22' and the main receive channel is calculated in process 52, and amounts to:

$$P_1 = P_{TX} \times \alpha \times G_{LNA} \times G_{MIX} \times G_{BB}$$

And also as described above, attenuator 38 of loopback reference channel 30' is set to a gain β in process 54, and a pure tone is again transmitted from the transmit channel in process 56. In process 72 according to this embodiment, a power level $P_4$ of the tone as received by loopback reference channel 30' and demodulated to baseband is measured. Because loopback reference channel 30' routes its attenuated square wave through LNA 22' in the arrangement of FIG. 3b, however, the power level $P_4$ measured in process 72 in this embodiment can be represented as:

$$P_4 = V_{DD} \times \beta \times G_{LNA} \times G_{MIX} \times G_{BB}$$

Following the measurement of power levels $P_1$ and $P_4$ in processes 52, 72, respectively, an absolute measure of the power level $P_{TX}$ is calculated in process 86 from the ratio of power levels $P_1$ and $P_4$:

$$\frac{P_1}{P_4} = \frac{P_{TX} \times \alpha \times G_{LNA} \times G_{MIX} \times G_{BB}}{V_{DD} \times \beta \times G_{LNA} \times G_{MIX} \times G_{BB}} = \frac{P_{TX} \times \alpha}{\beta V_{DD}}$$

As discussed above, attenuations $\alpha$ and $\beta$ are precisely known, as is the power supply voltage $V_{DD}$, permitting this ratio to be readily solved for an absolute measure of transmit power level $P_{TX}$ in process 86. Following the determination of transmit power level $P_{TX}$, the overall front-end gain, namely the product $G_{LNA} \times G_{MIX} \times G_{BB}$, is then calculated in process 88 according to this embodiment.

Similarly as discussed above relative to FIG. 4a, the calibration measurement operation of FIG. 4b can be repeated at multiple transmit power levels $P_{TX}$ to provide a measure of the linearity of power amplifiers 18, 20 in the transmit channel.

According to these embodiments, an efficient approach to the measurement of transmit power of a high-frequency transceiver system is provided. This transmit power measurement requires only minimal additional circuitry, consuming very little chip area in modern transceiver integrated circuits, and does not affect the power consumption of the device in normal operation. A high degree of accuracy in this power measurement can be attained, without requiring external high frequency test equipment; rather, the measurement is based on a DC voltage, which can be externally supplied to a high degree of precision by relatively inexpensive test equipment, or which can even be internally generated such as by a bandgap reference circuit. The measurement circuitry and operation is compatible with a variety of manufacturing technologies (CMOS, bipolar, BiCMOS, etc.), and can be implemented either as single-ended or differential circuits.

While one or more embodiments have been described in this specification, it is of course contemplated that modifications of, and alternatives to, these embodiments, such modifications and alternatives capable of obtaining one or more the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of calibrating a transmit power of a communications transceiver, comprising:
    transmitting a periodic signal at a selected frequency from a transmit channel in the transceiver, at a first programmed power setting;
    measuring a first power level of the transmitted signal as amplified by a receive amplifier in a receive channel of the transceiver, the first power level proportional to a gain of the receive amplifier;
    measuring a second power level of the transmitted signal as received by the receive channel of the transceiver and bypassing the receive amplifier;
    producing, from the transmitted signal as received by a loopback reference channel in the transceiver, a processed signal at an amplitude proportional to a regulated voltage;
    measuring a third power level of the processed signal;
    calculating the gain of the receive amplifier from a ratio of the first and second power levels; and
    calculating an absolute power level corresponding to the first programmed power setting from a ratio of the second and third power levels;
    wherein the transmit power of the communications transceiver is calibrated based on the absolute power.

2. The method of claim 1, wherein the step of producing the processed signal comprises:
    centering the received signal at a mid-rail level;
    applying the centered signal to a series of at least one buffer to produce a square wave at an amplitude of the regulated voltage;
    attenuating the square wave by a selected attenuation gain.

3. The method of claim 2, wherein the series of at least one buffer comprises:
    a plurality of buffers, constructed of transistors of increasing drive strength from a first buffer of the plurality of buffers receiving the centered signal to a final buffer of the plurality of buffers producing the square wave applied to the attenuating step.

4. The method of claim 2, wherein the centering step comprises:
    amplifying the received signal with a self-biased amplifier.

5. The method of claim 1, wherein the step of measuring the first power level comprises:
    amplifying the received signal with the receive amplifier;
    downconverting the amplified received signal to an intermediate frequency;
    converting the intermediate frequency signal to a digital baseband signal; and
    calculating the power level of the digital baseband signal.

6. The method of claim 5, wherein the step of measuring the second power level comprises:
    attenuating the received signal along a pass-through path in the receive channel bypassing the receive amplifier;
    downconverting the attenuated signal to a second intermediate frequency;
    converting the second intermediate frequency signal to a second digital baseband signal; and
    calculating the power level of the second digital baseband signal.

7. The method of claim 5, wherein the step of measuring the third power level comprises:
    downconverting the processed signal to a second intermediate frequency;
    converting the second intermediate frequency signal to a second digital baseband signal; and
    calculating the power level of the second digital baseband signal.

8. The method of claim 1, further comprising:
    generating the regulated voltage responsive to an external direct current (DC) voltage.

9. The method of claim 1, further comprising:
    producing a bandgap reference voltage; and
    generating the regulated voltage based on the bandgap reference voltage.

10. The method of claim 1, further comprising:
    repeating the transmitting step at a second programmed power setting; and
    then repeating the measuring steps, repeating the producing step, and repeating the calculating steps.

11. A method of calibrating a transmit power of a communications transceiver, comprising:

transmitting a periodic signal at a selected frequency from a transmit channel in the transceiver, at a first programmed power setting;
measuring a first power level of the transmitted signal as amplified by a receive amplifier in a receive channel of the transceiver, the first power level proportional to a gain of the receive amplifier;
amplifying the transmitted signal as received by a loopback reference channel in the transceiver by a replica receive amplifier;
measuring a second power level of the amplified signal from the replica receive amplifier; and
calculating an absolute power level corresponding to the first programmed power setting from a ratio of the first and second power levels;
wherein the transmit power of the communications transceiver is calibrated based on the absolute power.

12. The method of claim 11, further comprising:
determining an overall front-end gain from one of the first and second power levels and the calculated absolute power level.

13. The method of claim 11, further comprising:
repeating the transmitting step at a second programmed power setting; and
then repeating the measuring steps, repeating the amplifying step, and repeating the calculating step.

14. A communications transceiver, comprising:
a transmit channel comprising one or more power amplifier stages;
a receive channel comprising:
   a receive amplifier;
   one or more mixers for downconversion of signals from the receive amplifier, and for downconversion of signals received by the receive channel that bypass the receive amplifier;
   analog-to-digital converter circuitry, having an input coupled to an output of the receive amplifier;
a loopback reference channel, comprising:
   an amplifier;
   at least one buffer stage having an input coupled to an output of the amplifier; and
   an attenuator for applying a selected attenuation to a signal from an output of the at least one buffer stage;
digital circuitry coupled to a programmable power amplifier and to the analog-to-digital converter circuitry, for controlling the transceiver to perform a plurality of operations comprising:
   transmitting a signal from the transmit channel with the one or more power amplifier stages at a programmed power setting;
   measuring a first power level of the transmitted signal from a digital signal amplified by the receive amplifier and converted by the analog-to-digital converter circuitry;
   measuring a second power level of the transmitted signal as received by the receive channel of the transceiver and bypassing the receive amplifier;
   measuring a third power level of the transmitted signal from a digital signal corresponding to an output of the attenuator, the third power level being proportional to a power supply voltage; and
   calculating a gain of the receive amplifier from a ratio of the first and second power levels; and
   calculating an absolute power level corresponding to the first programmed power setting from a ratio of the second and third power levels;
   wherein a transmit power of the communications transceiver is calibrated based on the absolute power.

15. The transceiver of claim 14, wherein the digital circuitry comprises:
control logic for controlling the gain of the power amplifier stages; and
baseband circuitry, coupled to the analog-to-digital converter circuitry, for performing the measuring steps and for performing the calculating steps.

16. The transceiver of claim 14, wherein the amplifier of the loopback reference channel is a self-biased amplifier;
and wherein the at least one buffer stage comprises:
   a plurality of buffer stages, constructed of transistors of increasing drive strength from a first buffer stage of the plurality of buffer stages receiving the output of the self-biased amplifier to a final buffer stage of the plurality of buffer stages, each of the plurality of buffer stages biased by the power supply voltage.

17. The transceiver of claim 14, wherein the receive channel further comprises:
at least one mixer from the one or more mixers, for downconverting a signal at the output of the receive amplifier to an intermediate frequency;
and wherein the loopback reference channel further comprises:
   at least one replica mixer, for downconverting a signal at an output of the attenuator, the at least one replica mixer constructed in matching fashion relative to the at least one mixer from the one or more mixers of the receive channel.

18. The transceiver of claim 14, further comprising:
power management circuitry for generating the power supply voltage.

19. The transceiver of claim 18, wherein the power management circuitry generates the power supply voltage responsive to an external direct current (DC) voltage.

20. The transceiver of claim 18, further comprising:
a bandgap reference circuit, for generating a bandgap reference voltage;
wherein the power management circuitry generates the power supply voltage responsive to the bandgap reference voltage.

21. A communications transceiver, comprising:
a transmit channel comprising one or more power amplifier stages;
a receive channel comprising:
   a receive amplifier;
   one or more mixers for downconversion of signals from the receive amplifier;
   analog-to-digital converter circuitry, having an input coupled to an output of the receive amplifier;
a loopback reference channel, comprising:
   an amplifier;
   at least one buffer stage having an input coupled to an output of the amplifier; and
   an attenuator for applying a selected attenuation to a signal from an output of the at least one buffer stage;
   a replica receive amplifier receiving an output of the attenuator, and having an output coupled to the one or more mixers of the receive channel;
digital circuitry coupled to a programmable power amplifier and to the analog-to-digital converter circuitry, for controlling the transceiver to perform a plurality of operations comprising:
   transmitting a signal from the transmit channel with the one or more power amplifier stages at a programmed power setting;

measuring a first power level of the transmitted signal from a digital signal amplified by the receive amplifier and converted by the analog-to-digital converter circuitry;

measuring a second power level of the amplified signal from the replica receive amplifier;

calculating an absolute power level corresponding to the first programmed power setting from a ratio of the first and second power levels;

wherein a transmit power of the communications transceiver is calibrated based on the absolute power.

22. The transceiver of claim 21, further comprising:

determining an overall front-end gain from one of the first and second power levels and the calculated absolute power level.

23. The transceiver of claim 21, wherein the digital circuitry comprises:

control logic for controlling the gain of the power amplifier stages; and baseband circuitry, coupled to the analog-to-digital converter circuitry, for performing the measuring steps and for performing the calculating step.

24. The transceiver of claim 21, wherein the amplifier of the loopback reference channel is a self-biased amplifier;

and wherein the at least one buffer stage comprises:

a plurality of buffer stages, constructed of transistors of increasing drive strength from a first buffer stage of the plurality of buffer stages receiving the output of the self-biased amplifier to a final buffer stage of the plurality of buffer stages, each of the plurality of buffer stages biased by a power supply voltage.

* * * * *